United States Patent
Lazaridis et al.

(10) Patent No.: US 8,331,340 B2
(45) Date of Patent: Dec. 11, 2012

(54) CALL FORWARDING METHODS AND APPARATUS FOR MOBILE COMMUNICATION DEVICES WHICH OPERATE IN WWANS AND WLANS

(75) Inventors: Mihal Lazaridis, Waterloo (CA); Thomas Charles Nagy, Waterloo (CA); Vytautas Robertas Kezys, Hamilton (CA); Ingo W. Weigele, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/311,015

(22) Filed: Dec. 5, 2011

(65) Prior Publication Data
US 2012/0076053 A1   Mar. 29, 2012

Related U.S. Application Data

(63) Continuation of application No. 11/669,692, filed on Jan. 31, 2007, now Pat. No. 8,085,742.

(51) Int. Cl.
*H04W 4/00* (2009.01)

(52) U.S. Cl. .................. 370/338; 455/432.17; 455/436; 455/417; 455/428; 455/404.1; 370/329; 370/331; 370/332; 370/503

(58) Field of Classification Search .............. 455/432.1, 455/436, 417, 428, 404.1, 435.1, 421, 433, 455/435.2, 445; 370/338, 329, 331, 332, 370/503, 360, 352, 395, 401, 442, 428, 496
See application file for complete search history.

(56) References Cited

U.S. PATENT DOCUMENTS

| | | | |
|---|---|---|---|
| 7,319,880 B2 | 1/2008 | Sin | |
| 7,398,088 B2 | 7/2008 | Belkin et al. | |
| 7,406,324 B1 | 7/2008 | McConnell | |
| 2002/0085516 A1 | 7/2002 | Bridgelall | |
| 2003/0181202 A1 | 9/2003 | Link, II et al. | |

(Continued)

FOREIGN PATENT DOCUMENTS

EP   0700227 A2   3/1996

(Continued)

OTHER PUBLICATIONS

Khadivi et al., "Dropping Rate Reduction in Hybrid WLAN/Cellular Systems by Mobile Ad Hoc Relaying", Wireless Personal Communications, 2006, pp. 515-542.
EP Search Report for EP Application No. 07101469, Aug. 8, 2007.

*Primary Examiner* — Kwasi Karikari
(74) *Attorney, Agent, or Firm* — John J. Oskorep, Esq.

(57) ABSTRACT

A mobile device operates in a WLAN for VoIP communications, which includes registering with registrar server functionality of a SIP proxy server with a SIP identity which is further communicated to a location server. In response to an incoming voice call from a caller via a telephone network, the mobile device receives an INVITE request which is issued from a gateway and forwarded from the SIP proxy server. The mobile device sends a response to the SIP proxy server which is communicated to the caller via the gateway. When switching from the WLAN to the cellular network, the mobile device sends via the WLAN to the location server a message for forwarding voice calls directed to the SIP identity to the telephone number. The mobile device also sends via the cellular network a message for canceling the forwarding of voice calls directed to telephone number to the SIP identity.

16 Claims, 8 Drawing Sheets

U.S. PATENT DOCUMENTS

| | | |
|---|---|---|
| 2004/0090937 A1 | 5/2004 | Chaskar et al. |
| 2004/0205158 A1 | 10/2004 | Hsu |
| 2004/0246990 A1 | 12/2004 | Krishnamurthi et al. |
| 2005/0025163 A1 | 2/2005 | Christie, IV |
| 2005/0094556 A1 | 5/2005 | Thompson et al. |
| 2005/0096024 A1 | 5/2005 | Bicker et al. |
| 2005/0114533 A1 | 5/2005 | Hullfish et al. |
| 2005/0119005 A1 | 6/2005 | Segal et al. |
| 2006/0046752 A1 | 3/2006 | Kalavade |
| 2006/0126562 A1 | 6/2006 | Liu |
| 2006/0166674 A1 | 7/2006 | Bennett et al. |
| 2007/0087766 A1 | 4/2007 | Hardy et al. |
| 2007/0092073 A1 | 4/2007 | Olshansky et al. |
| 2008/0102843 A1 | 5/2008 | Todd et al. |
| 2008/0171549 A1 | 7/2008 | Hursey et al. |
| 2009/0141685 A1 | 6/2009 | Berglund |

FOREIGN PATENT DOCUMENTS

| | | |
|---|---|---|
| EP | 1775971 A1 | 4/2007 |
| EP | 1219125 B1 | 7/2008 |
| WO | 2003065654 A1 | 8/2003 |

CALL FORWARDING METHODS AND APPARATUS FOR MOBILE COMMUNICATION DEVICES WHICH OPERATE IN WWANS AND WLANS

CROSS-REFERENCE TO RELATED APPLICATION

The present application is a continuation of and claims priority to U.S. Non-Provisional Patent Application having application Ser. No. 11/669,692 and filing date of 31 Jan. 2007, now U.S. Pat. No. 8,085,742, which is hereby incorporated by reference herein.

BACKGROUND

1. Field of the Technology

The present application relates generally to mobile communication devices which operate in both wireless wide area networks (WWANs) such as cellular telecommunication networks and wireless local area networks (WLANs) such as 802.11-based networks.

2. Description of the Related Art

A mobile communication device may be designed to operate on two different types of heterogeneous wireless networks, such as a wireless local area network (WLAN) (e.g. 802.11-based wireless network) and a wireless wide area network (WWAN) (e.g. a cellular telecommunications network). Two different wireless transceiver portions of the mobile device are utilized for communications in the WLAN and WWAN. The mobile device switches operations between the WLAN and the WWAN depending on its location and/or other factors.

Each wireless transceiver portion of the mobile device is associated with a unique identification number (e.g. telephone number, IP address, session initiation protocol (SIP) address, etc.) so that the mobile device may receive voice calls through both WLAN and WWAN. When the mobile device operates in the WLAN, it is reachable by its WLAN identification number in the WLAN but otherwise it may be out-of-service with the WWAN and not be reachable with use of the WWAN identification number. On the other hand, when the mobile device operates in the WWAN, it is reachable by its WWAN identification number in the WWAN but it otherwise may be out-of-service with the WLAN and not be reachable with use of the WLAN identification number.

Accordingly, what are needed are methods and apparatus to improve the reachability techniques for such dual mode or multi-mode mobile communication terminals.

BRIEF DESCRIPTION OF THE DRAWINGS

Embodiments of the present application will now be described, by way of example only, with reference to the attached figures. Same reference numerals are used in different figures to denote similar elements.

DETAILED DESCRIPTION OF THE PREFERRED EMBODIMENTS

Methods and apparatus for use by a mobile communication device in facilitating voice calls through a wireless local area network (WLAN) and a wireless wide area network (WWAN) are disclosed. When switching communication operations from a WLAN coverage region of the WLAN to a WWAN coverage region of the WWAN, the mobile device causes a message for forwarding voice calls to a WWAN identification number of the mobile device to be transmitted through the WLAN. The mobile device also causes a message for cancelling the forwarding of voice calls to a WLAN identification number of the mobile device to be transmitted through the WWAN. When switching communication operations from the WWAN coverage region of the WWAN to the WLAN coverage region of the WLAN, the mobile device causes a message for forwarding voice calls to the WLAN identification number of the mobile device to be transmitted through the WWAN. The mobile device also causes a message for cancelling the forwarding of voice calls to the WWAN telephone number of the mobile device to be transmitted through the WLAN. Other additional and alternative techniques are described for more reliable reachability.

Figure 1:
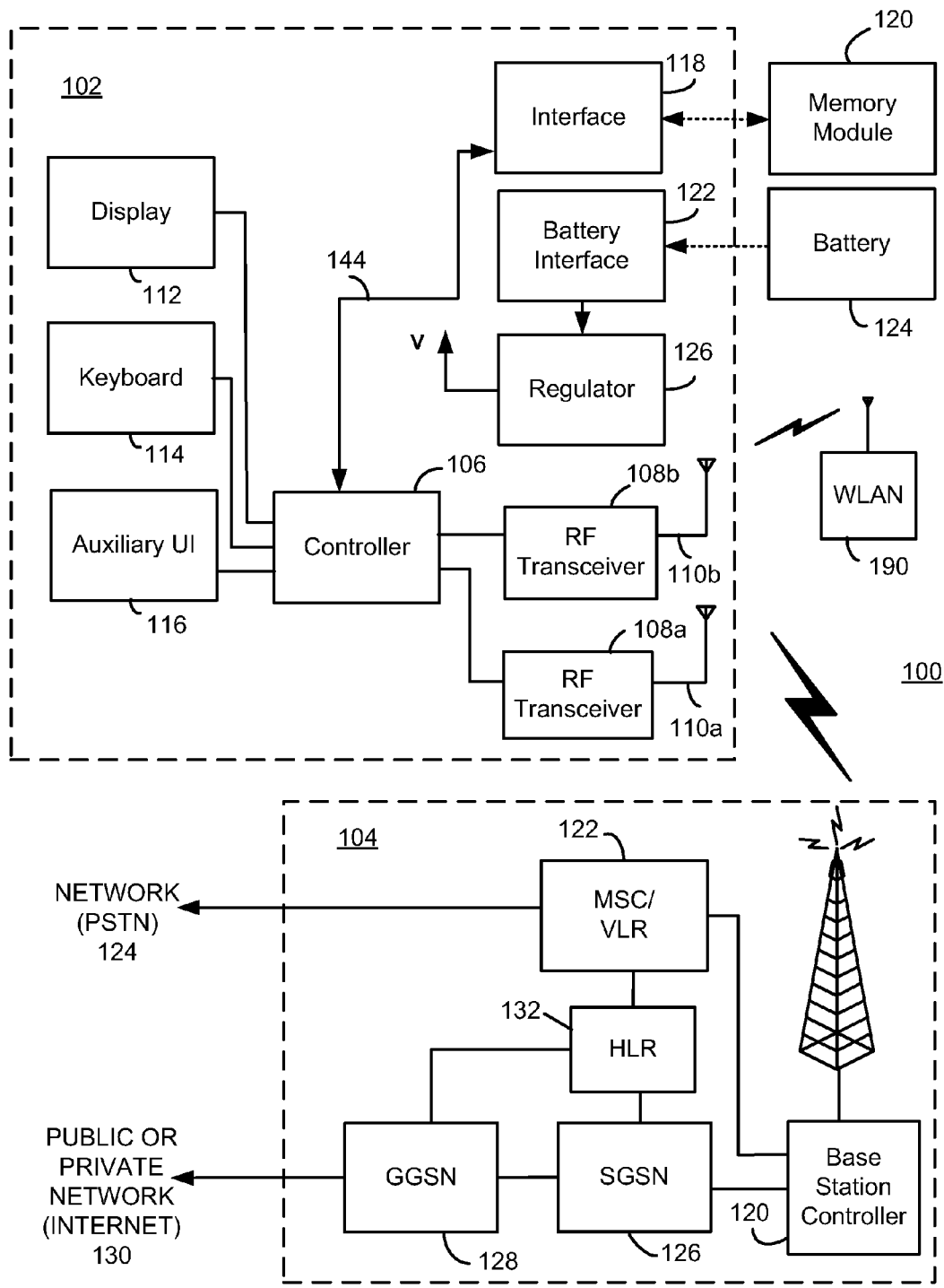
FIG. 1 is a schematic block diagram illustrating the basic components of a mobile terminal operating in a wireless communication system which includes a wireless wide area network (e.g. a cellular telecommunications network) as well as a wireless local area network (WLAN) (e.g. an 802.11-based network)

Referring now to the drawings, FIG. 1 is a schematic block diagram illustrating the basic components of a mobile terminal or mobile communication device 102 which operates in a wireless communication system 100. As shown in FIG. 1, mobile device 102 is adapted to communicate with a wireless communication network 104 which is a cellular telecommunications network. Also as shown, mobile device 102 is adapted to communicate with a wireless local area network (WLAN) 190 such as an 802.11-based wireless network. For wireless communication with wireless network 104, mobile device 102 utilizes radio frequency (RF) transceiver circuitry 108a and an antenna 110a. For wireless communication with WLAN 190, mobile device 102 utilizes RF transceiver circuitry 108b for 802.11-based communications and an antenna 110b. With such configuration, mobile device 102 may be referred to as a "dual mode" communication device. Although shown in FIG. 1 as having separate and independent transceiver components, at least some portions or components of these otherwise different transceivers may be shared where possible.

Mobile device 102 preferably includes a visual display 112, a keyboard 114, and perhaps one or more auxiliary user interfaces (UI) 116, each of which is coupled to a controller 106. Controller 106 is also coupled to RF transceiver circuitry 108a and antenna 110a as well as RF transceiver circuitry 108b and antenna 110b. Typically, controller 106 is embodied as a central processing unit (CPU) which runs operating system software in a memory component (not shown). Controller 106 will normally control overall operation of mobile device 102, whereas signal-processing operations associated with communication functions are typically executed by the RF transceiver circuitry. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals over wireless communication links. For example, mobile device 102 may communicate with wireless network 104 via antenna 110a. RF transceiver circuitry 108a performs functions similar to those of a base station controller 120, including for example modulation/demodulation and possibly encoding/decoding and encryption/decryption. It is also contemplated that RF transceiver circuitry 108a may perform certain functions in addition to those performed by base station controller 120. In the embodiment shown in FIG. 1, wireless network 104 technology is configured in accordance with General Packet Radio Service (GPRS) and a Global Systems for Mobile (GSM) technologies. However, any suitable type of communication protocols may be utilized. For example, the network may be based on code division multiple access (CDMA) or other suitable technologies. It will be apparent to those skilled in art that RF transceiver circuitry 108a will be adapted to particular wireless network or networks in which mobile device 102 is intended to operate.

Mobile device 102 also includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. Mobile device 102 also operates using a memory module 120, such as a Subscriber Identity Module (SIM) (or e.g. a Universal SIM or U-SIM, or a Removable User Identity Module or R-UIM), which is connected to or inserted in mobile device 102 at an interface 118.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108a and antenna 110a may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile device 102 may have a more particular implementation as described later in relation to mobile station 202 of FIG. 2.

Using RF transceiver circuitry 108a, mobile device 102 communicates in and through wireless communication network 104. In the embodiment of FIG. 1, wireless network 104 is configured in accordance with GSM and GPRS technologies. Wireless network 104 includes a base station controller (BSC) 120 with an associated tower station, a Mobile Switching Center (MSC) 122, a Home Location Register (HLR) 132, a Serving GPRS Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

The tower station coupled to BSC 120 may be a fixed transceiver station, and the tower station and BSC 120 may together be referred to as fixed transceiver equipment. The fixed transceiver equipment provides wireless network coverage for a particular coverage area commonly referred to as a "cell". The transceiver equipment transmits communication signals to and receives communication signals from mobile devices within its cell via the tower station. The transceiver equipment normally performs such functions as modulation and possibly encoding and/or encryption of signals to be transmitted to the mobile device in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

For all mobile device's 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 may be enhanced for more efficient co-ordination of GPRS and non-GPRS services and functionality (e.g. paging for circuit-switched calls which may be performed more efficiently via SGSN 126, and combined GPRS and non-GPRS location updates).

SGSN 126 is at the same hierarchical level as MSC 122 and keeps track of the individual locations of mobile devices. SGSN 126 also performs security functions and access control. GGSN 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming data, or SMS messages over GPRS. In order to send and receive GPRS data, mobile device 102 assists in activating the packet data address that it wants to use. This operation makes mobile device 102 known to GGSN 128; interworking with external data networks may thereafter commence. User data may be transferred transparently between mobile device 102 and the external data networks using, for example, encapsulation and tunneling. Data packets are equipped with GPRS-specific protocol information and transferred between mobile device 102 and GGSN 128.

Although the present embodiment relates to a WLAN of the 802.11 type and a WWAN of the cellular network type, any suitable wireless network technologies may be utilized, such as WiMAX technologies (e.g. 802.16e-based technologies). For example, the WLAN may be an 802.11-based network and the WWAN may be an 802.16e-based network. As another example, the WLAN may be an 802.16e-based network and the WWAN may be the cellular network.

Figure 2:
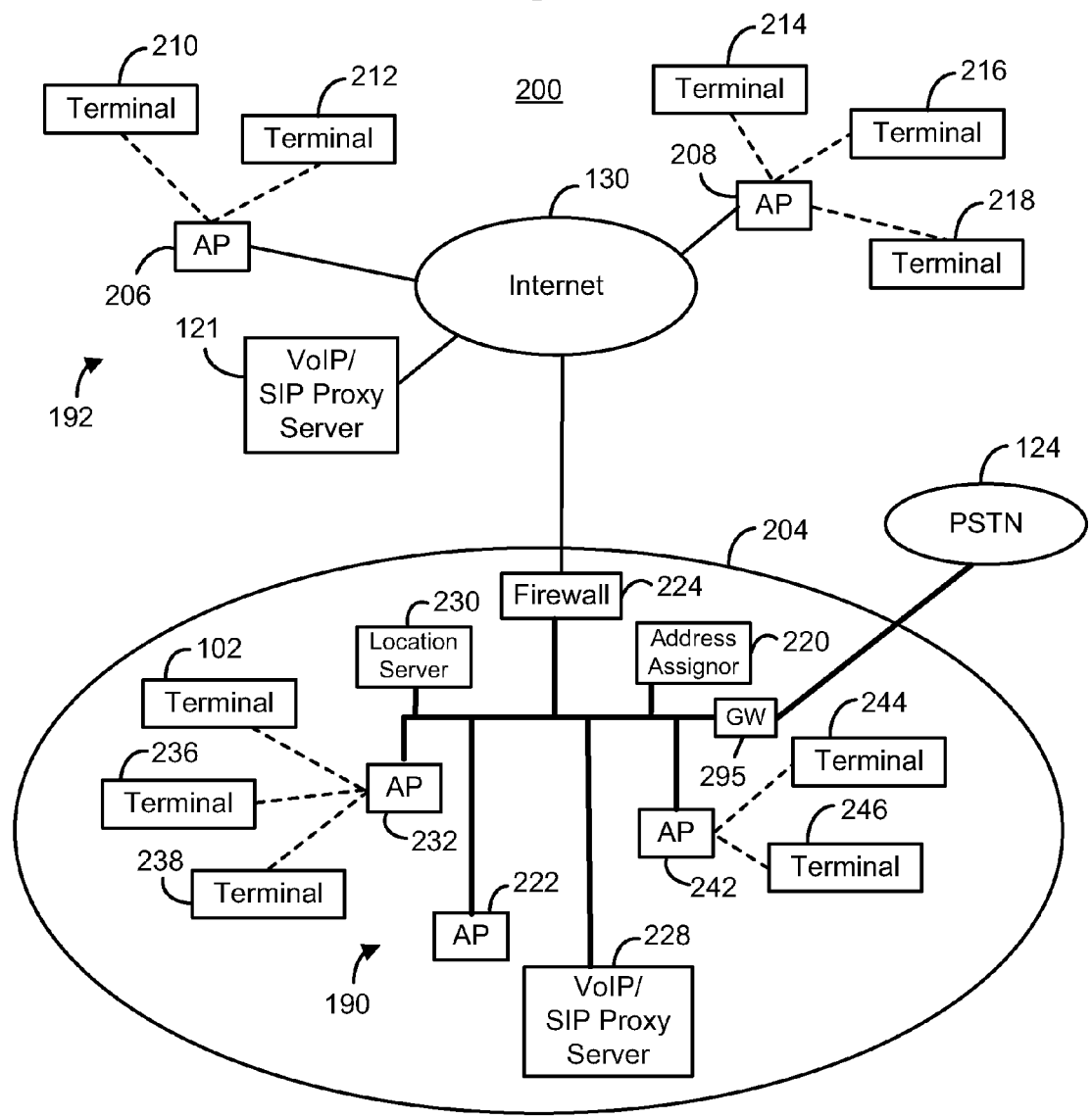
FIG. 2 is a block diagram which illustrates a communication system which includes a plurality of mobile terminals which operate in the WLAN.

To illustrate the basic WLAN environment and architecture, FIG. 2 is a block diagram which shows a communication system 200 which includes a public network 130 (e.g. the Internet 130) and a private network 204. In the present embodiment, private network 204 is or includes the WLAN 190 of FIG. 1. In the WLAN, terminals (e.g. mobile terminal or device 102 of FIG. 1) may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards, for example. The terminals shown in public network 130 include terminals 210 and 212 which have interfaced with AP 206, and terminals 214, 216, and 218 which have interfaced with AP 208. The terminals shown in private network 204 include terminals 102, 236, 238 which have interfaced with AP 232, and terminals 244 and 246 which have interfaced with AP 242. Outside of the networks 130 and 204 of FIG. 2 is a wireless wide area network (WWAN) (not shown in FIG. 2) which may be a cellular telecommunication network having a plurality of base stations and additional components (e.g. see FIG. 1). At least some of the terminals of FIG. 2 are adapted to operate in both WLANs and WWANs.

Private network 204 which includes the WLAN provides various data and communication services to its terminals. For example, private network 204 may provide for voice telephony communication services for its terminals with use of Voice over IP (VoIP) communications. For these types of VoIP services, private network 204 may utilize servers such as a Session Initiation Protocol (SIP) proxy server 228 to help facilitate VoIP communications. In the present embodiment, communication system 200 has a SIP proxy server 121 in a public WLAN 192 as well. Note that some communication applications utilized by terminals, such VoIP applications, require the use of SIP. SIP is well-documented in standard documents such as Request For Comments (RFC) 3261. When terminals enter into the WLAN, they are typically assigned a unique IP address through an address assigning mechanism 220 such as a dynamic host configuration protocol (DHCP) server. Note also that a firewall 124 may be provided in private network 104 for preventing unauthorized access from unauthorized users in public network 102.

As apparent, mobile terminals may operate to place and receive voice calls within WLANs with the assistance of SIP components such as SIP proxy servers 121 and 228. SIP proxy servers may include one or more SIP functional components such as proxy server functionality, registrar server functionality, redirect server functionality, and location server functionality. In the present embodiment, a separate location server 230 is used in private network 204 and is updated regularly to include the last known addresses of the mobile terminals. Voice calls to a mobile terminal in a WLAN is typically made with use of a SIP identity or SIP address. A SIP address is an e-mail address in the format of sip: userID@gateway.com. The user ID may be a user name or an E.164 address. Mobile terminals typically register with a registrar server using their assigned SIP addresses, and the registrar server provides this information to location server 230 upon request.

When a caller calls a mobile terminal, an INVITE request is sent to the proxy server which identifies the proper path and forwards the request to the mobile terminal. A gateway 295 (i.e. a VoIP-to-PSTN, PSTN-to-VoIP gateway) is connected in private network 204 and is operative to communicate with PSTN 124 so that voice calls may be made through ordinary telephone lines (and e.g. cellphones in wireless network 104) as well as through IP networks. Thus, in the case of an incoming call through PSTN 124, gateway 295 is operative to issue this INVITE request in response to detecting the incoming call. The mobile terminal responds to the proxy server which, in turn, forwards the response to the caller (via gateway 295 if the call is through PSTN 124). A VoIP session for VoIP communications may then proceed between the caller and the mobile terminal. When a redirect server is used, the caller sends an INVITE request to the redirect serer which contacts location server 230 to determine the path of the mobile terminal. The redirect server sends the location information back to the caller, which sends a request to the mobile terminal at the address indicated in the redirection information.

Figure 3:
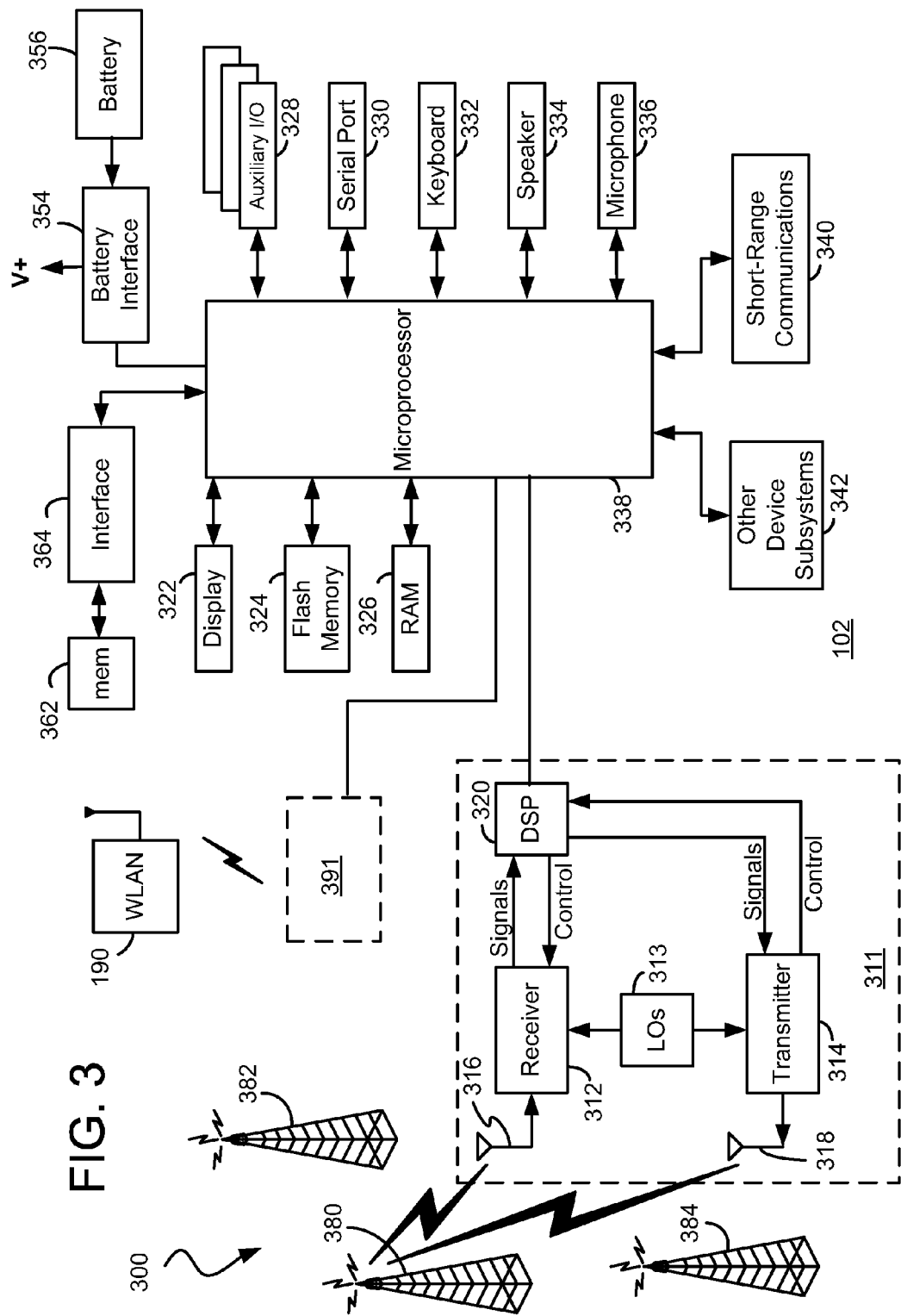
FIG. 3 is a more detailed schematic diagram of the mobile terminals of FIG. 1, namely, a mobile station of the preferred embodiment.

Referring now to FIG. 3, electrical components of a preferred mobile terminal 102 (e.g. a mobile communication device or mobile station) will be described. Terminal 102 is adapted to operate in connection with the communications systems 100/200 of FIGS. 1 and 2 (WLAN and WWAN). Terminal 102 is preferably a two-way mobile communication device having at least voice and advanced data communication capabilities, including the capability to communicate with other computer systems. Depending on the functionality provided by terminal 102, it may be referred to as a data messaging device, a two-way pager, a cellular telephone with data messaging capabilities, a wireless Internet appliance, or a data communication device (with or without telephony capabilities).

As described, terminal 102 is adapted to wirelessly communicate with WLAN 190. Also as shown, terminal 102 may be adapted to wirelessly communicate with cellular base station transceiver systems 300. For communication with cellular networks, terminal 102 utilizes communication subsystem 311. For communication with WLANs, terminal 102 utilizes an additional communication subsystem 391 which has the same or similar structural components as communication subsystem 311. With such configuration, terminal 102 may be referred to as a "dual mode" mobile station. Although shown in FIG. 3 as having separate and independent subsystems, at least some portions or components of these otherwise different subsystems may be shared where possible.

Communication subsystem 311 includes a receiver 312, a transmitter 314, and associated components, such as one or more (preferably embedded or internal) antenna elements 316 and 318, local oscillators (LOs) 313, and a processing module such as a digital signal processor (DSP) 320. Communication subsystem 311 is analogous to RF transceiver circuitry 108*a* and antenna 110*a* shown in FIG. 1. As will be apparent to those skilled in field of communications, particular design of communication subsystem 311 depends on the communication network in which terminal 102 is intended to operate.

Terminal 102 may send and receive communication signals through the network after required network procedures have been completed. Signals received by antenna 316 through the network are input to receiver 312, which may perform such common receiver functions as signal amplification, frequency down conversion, filtering, channel selection, and like, and in example shown in FIG. 3, analog-to-digital (A/D) conversion. A/D conversion of a received signal allows more complex communication functions such as demodulation and decoding to be performed in DSP 320. In a similar manner, signals to be transmitted are processed, including modulation and encoding, for example, by DSP 320. These DSP-processed signals are input to transmitter 314 for digital-to-analog (D/A) conversion, frequency up conversion, filtering, amplification and transmission over communication network via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Network access is associated with a subscriber or user of terminal 102, and therefore terminal 102 requires a memory module 362, such as a Subscriber Identity Module or "SIM" card, a Universal SIM (U-SIM), or a Removable User Identity Module (R-UIM), to be inserted in or connected to an interface 364 of terminal 102 in order to operate in the network. Since terminal 102 is a mobile battery-powered device, it also includes a battery interface 354 for receiving one or more rechargeable batteries 356. Such a battery 356 provides electrical power to most if not all electrical circuitry in terminal 102, and battery interface 354 provides for a mechanical and electrical connection for it. Battery interface 354 is coupled to a regulator (not shown in FIG. 3) that provides power V+ to all of the circuitry.

Terminal 102 includes a microprocessor 338 that controls overall operation of terminal 102. This control includes the call forwarding processing techniques of the present application. Communication functions, including at least data and voice communications, are performed through communication subsystem 311. Microprocessor 338 also interacts with additional device subsystems such as a display 322, a flash memory 324, a random access memory (RAM) 326, auxiliary input/output (I/O) subsystems 328, a serial port 330, a keyboard 332, a speaker 334, a microphone 336, a short-range communications subsystem 340, and any other device subsystems generally designated at 342. Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list. Operating system software used by microprocessor 338 is preferably stored in a persistent store such as flash memory 324, which may alternatively be a read-only memory (ROM) or similar storage element (not shown). Those skilled in the art will appreciate that the operating system, specific device applications, or parts thereof, may be temporarily loaded into a volatile store such as RAM 326.

Microprocessor 338, in addition to its operating system functions, preferably enables execution of software applications on terminal 102. A predetermined set of applications that control basic device operations, including at least data and voice communication applications, will normally be installed on terminal 102 during its manufacture. A preferred application that may be loaded onto terminal 102 may be a personal information manager (PIM) application having the ability to organize and manage data items relating to user such as, but not limited to, e-mail, calendar events, voice mails, appointments, and task items. Naturally, one or more memory stores are available on terminal 102 and SIM 356 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on terminal 102 with respect to such items. This is especially advantageous where the host computer system is the wireless device user's office computer system. Additional applications may also be loaded onto terminal 102 through network, an auxiliary I/O subsystem 328, serial port 330, short-range communications subsystem 340, or any other suitable subsystem 342, and installed by a user in RAM 326 or preferably a non-volatile store (not shown) for execution by microprocessor 338. Such flexibility in application installation increases the functionality of terminal 102 and may provide enhanced on-device functions, communication-related functions, or both. For example, secure communication applications may enable electronic commerce functions and other such financial transactions to be performed using terminal 102.

In a data communication mode, a received signal such as a text message, an e-mail message, or web page download will be processed by communication subsystem 311 and input to microprocessor 338. Microprocessor 338 will preferably further process the signal for output to display 322 or alternatively to auxiliary I/O device 328. A user of terminal 102 may also compose data items, such as e-mail messages, for example, using keyboard 332 in conjunction with display 322 and possibly auxiliary I/O device 328. Keyboard 332 is preferably a complete alphanumeric keyboard and/or telephone-type keypad. These composed items may be transmitted over a communication network through communication subsystem 311. For voice communications, the overall operation of terminal 102 is substantially similar, except that the received signals would be output to speaker 334 and signals for transmission would be generated by microphone 336. Alternative voice or audio I/O subsystems, such as a voice message recording subsystem, may also be implemented on terminal 102. Although voice or audio signal output is preferably accomplished primarily through speaker 334, display 322 may also be used to provide an indication of the identity of a calling party, duration of a voice call, or other voice call related information, as some examples.

Serial port 330 in FIG. 3 is normally implemented in a personal digital assistant (PDA)-type communication device for which synchronization with a user's desktop computer is a desirable, albeit optional, component. Serial port 330 enables a user to set preferences through an external device or software application and extends the capabilities of terminal 102 by providing for information or software downloads to terminal 102 other than through a wireless communication network. The alternate download path may, for example, be used to load an encryption key onto terminal 102 through a direct and thus reliable and trusted connection to thereby provide secure device communication. Short-range communications subsystem 340 of FIG. 3 is an additional optional component that provides for communication between terminal 102 and different systems or devices, which need not necessarily be similar devices. For example, subsystem 340 may include an infrared device and associated circuits and components, or a Bluetooth™ communication module to provide for communication with similarly enabled systems and devices. Bluetooth™ is a registered trademark of Bluetooth SIG, Inc.

According to the present application, a mobile terminal utilizes call forwarding techniques to be reliably reachable when operating in either a WLAN or WWAN. When switching communication operations from a WLAN coverage region of the WLAN to a WWAN coverage region of the WWAN, the mobile terminal causes a message for forwarding voice calls to a WWAN identification number of the mobile terminal to be transmitted through the WLAN. The mobile terminal also causes a message for cancelling the forwarding of voice calls to a WLAN identification number of the mobile terminal to be transmitted through the WWAN. When switching communication operations from the WWAN coverage region of the WWAN to the WLAN coverage region of the WLAN, the mobile terminal causes a message for forwarding voice calls to the WLAN identification number of the mobile device to be transmitted through the WWAN. The mobile terminal also causes a message for cancelling the forwarding of voice calls to the WWAN telephone number of the mobile terminal to be transmitted through the WLAN. Other additional and alternative techniques are described for reliable reachability.

FIGS. 4-7 are top down views of an environment within which mobile terminal 102 has been carried along a travel path 410 through wireless communication systems 100/200 which include a WWAN 450 (e.g. a GSM/GPRS network) and one or more wireless local area networks (WLANs) 190 and 404. Although only cell coverage regions are shown in the top down views for simplicity, each network 190, 404, and 450 includes those network components and functionality as described in relation to FIGS. 1-2. When comparing the two types of networks, WWAN 450 and WLANs 190/404 may be referred to as heterogeneous wireless communication networks.

In the embodiment described, mobile terminal 102 operates for communications with only one of the networks (WLAN or WWAN) at any given time, and may give preference to operate with WLANs over WWANs when a WLAN is available for communications. Note that oftentimes, if not always, mobile terminal 102 operates within the coverage region of WWAN 450 although it may not set its transceiver for communications with WWAN 450.

Figure 4:
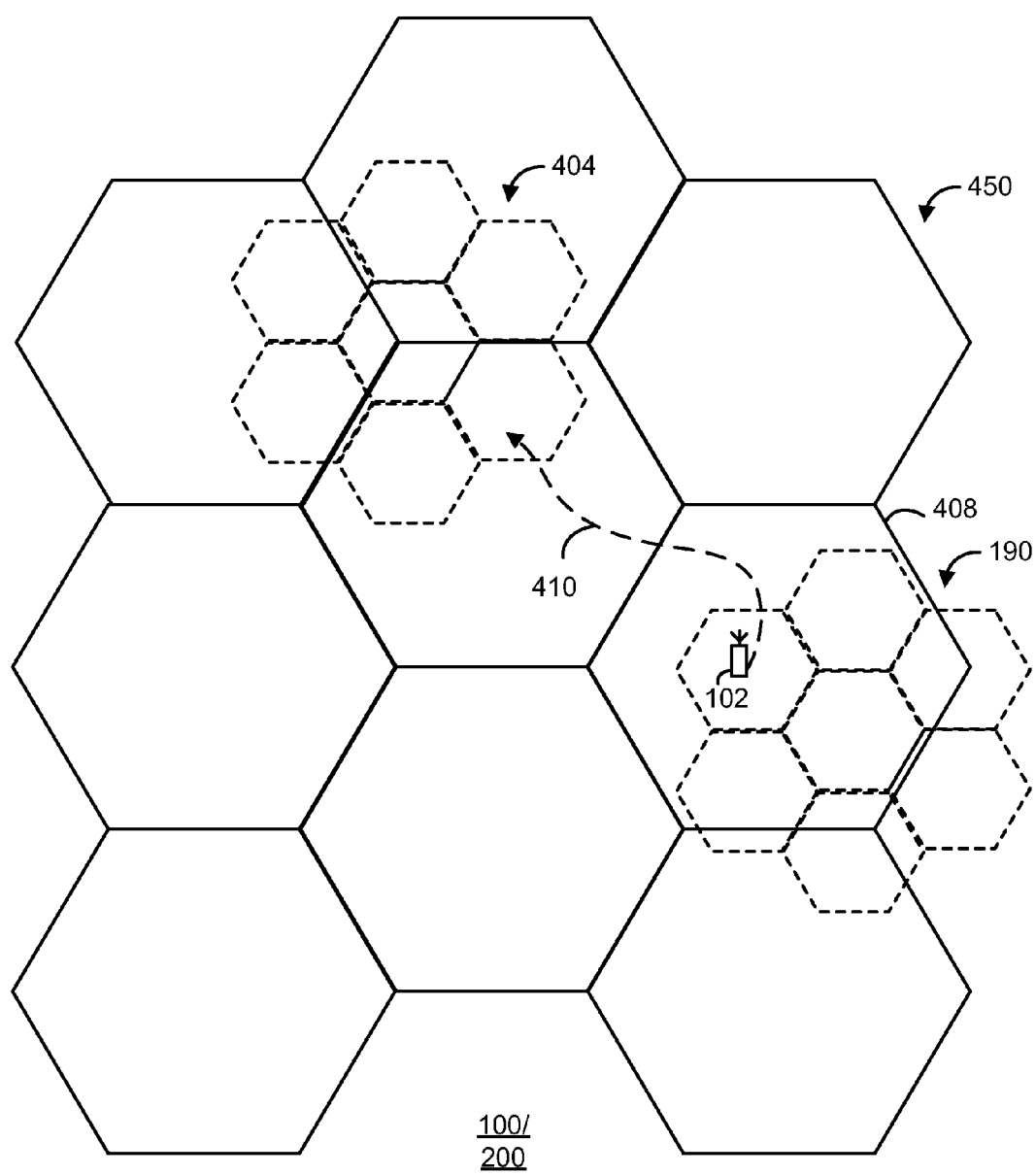
FIGS. 4-7 are top down views showing a mobile terminal moving in accordance with a travel path through coverage regions of the WWAN and the WLANs.
Figure 5:
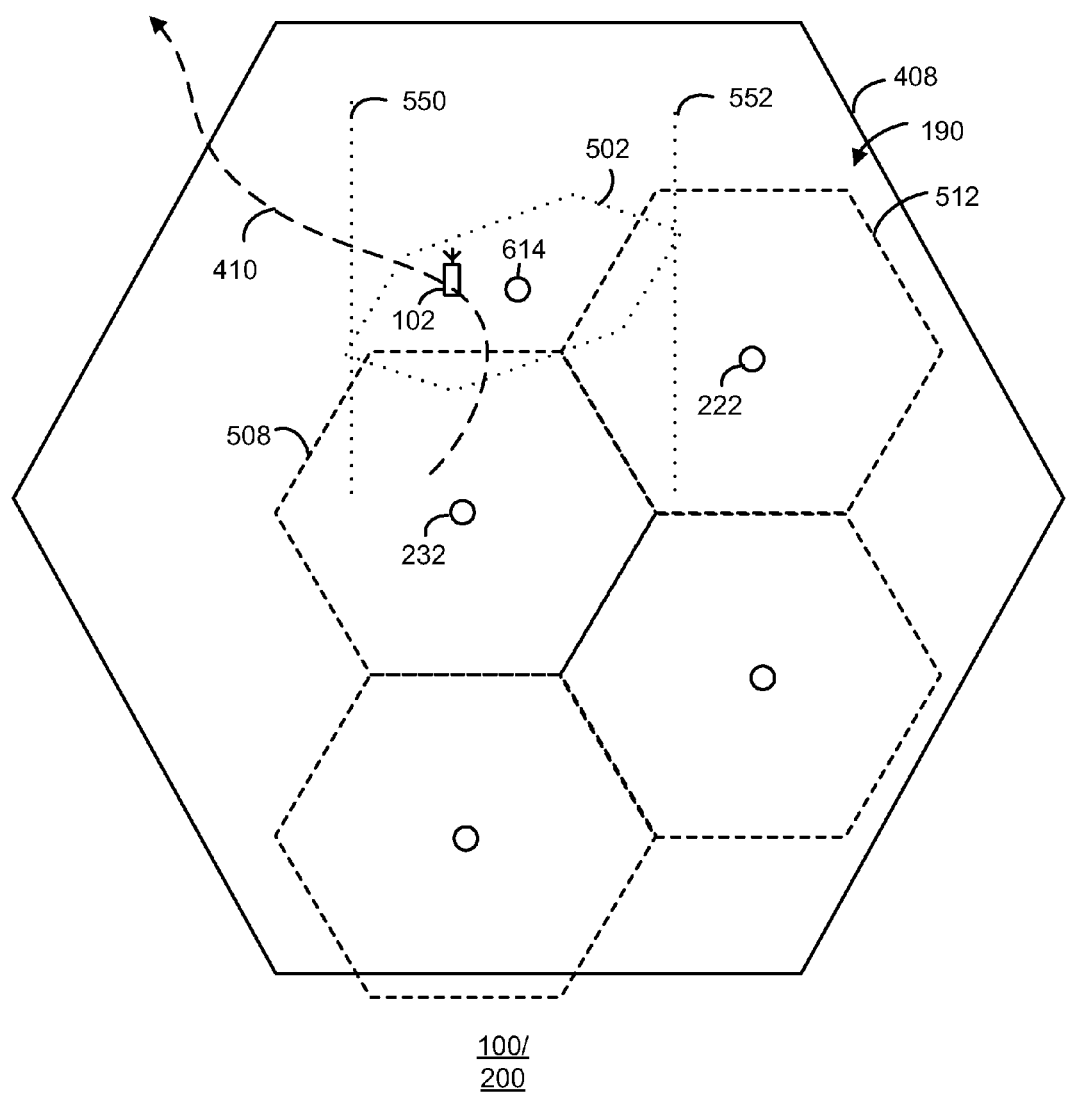
Figure 6:
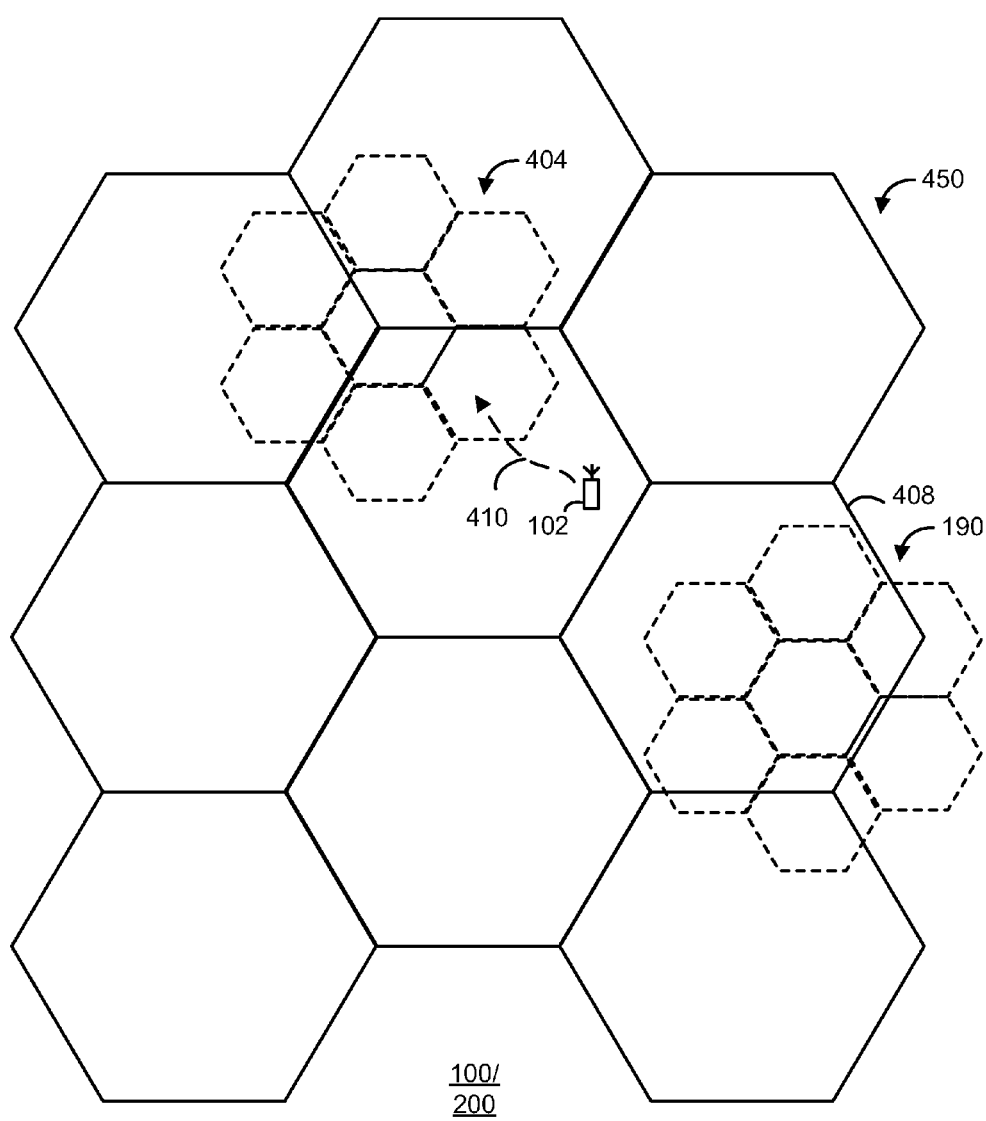
Figure 7:
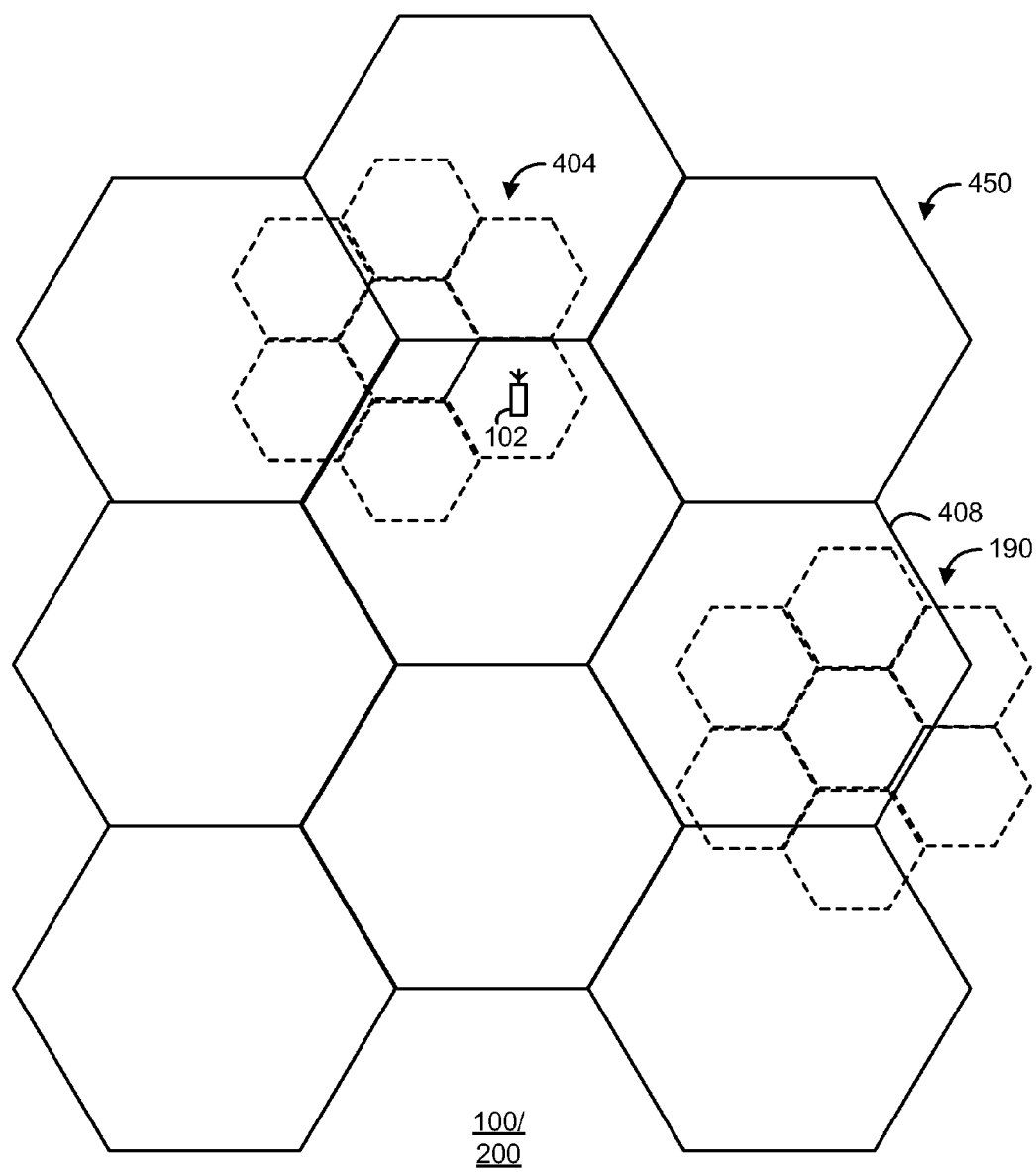

In FIG. 4, mobile terminal 102 is shown within the coverage region of WLAN 190 for communications through WLAN 190; in FIGS. 5-6, mobile terminal 102 is shown to have moved along travel path 410 outside of the coverage region of WLAN 190 and within the coverage region of WWAN 450 for communications through WWAN 450 in a WWAN coverage region 450; in FIG. 7, mobile terminal 102 is shown to have moved within the coverage region of WLAN 404 for communications through WLAN 404. A close-up top down view is provided in FIG. 5, where it is shown that WLAN 190 has a plurality of wireless access points (APs) including AP 222 and 232 associated with WLAN coverage regions 512 and 508, respectively, which define an RF coverage border between WLAN 190 and the WWAN.

As described earlier, mobile terminal 102 has two different RF transceiver portions (e.g. transceiver portions 110a and 110b of FIG. 1) associated with the two different types of networks (WLAN and WWAN) and operates for communications with only one of the networks (WLAN or WWAN) at any given time. Each RF transceiver portion of mobile terminal 102 is associated with a unique identification number (e.g. telephone number, IP address, SIP address, etc.) so that mobile terminal 102 may receive voice calls through both WLAN and WWAN: a WLAN identification number for WLANs 190 and 404 and a WWAN identification number for WWAN 450.

Normally, when mobile terminal 102 operates in WLAN 190 and 404 (e.g. FIG. 4 or FIG. 7), it is reachable by its WLAN identification number in WLAN 190 and 404 but otherwise may be out-of-service with WWAN 450 and not be reachable with use of the WWAN identification number. Alternatively, from a cost standpoint it may be preferred to reach mobile terminal 102 via WLAN 190 and 404 instead of WWAN 450 even when the call is placed using the WWAN identification number. On the other hand, when mobile terminal 102 operates in WWAN 450 (e.g. FIG. 6), it is reachable by its WWAN identification number in WWAN 450 but otherwise may be out-of-service with WLAN 190/404 and not be reachable with use of the WLAN identification number. Using techniques of the present application, however, these concerns are alleviated.

Figure 8:
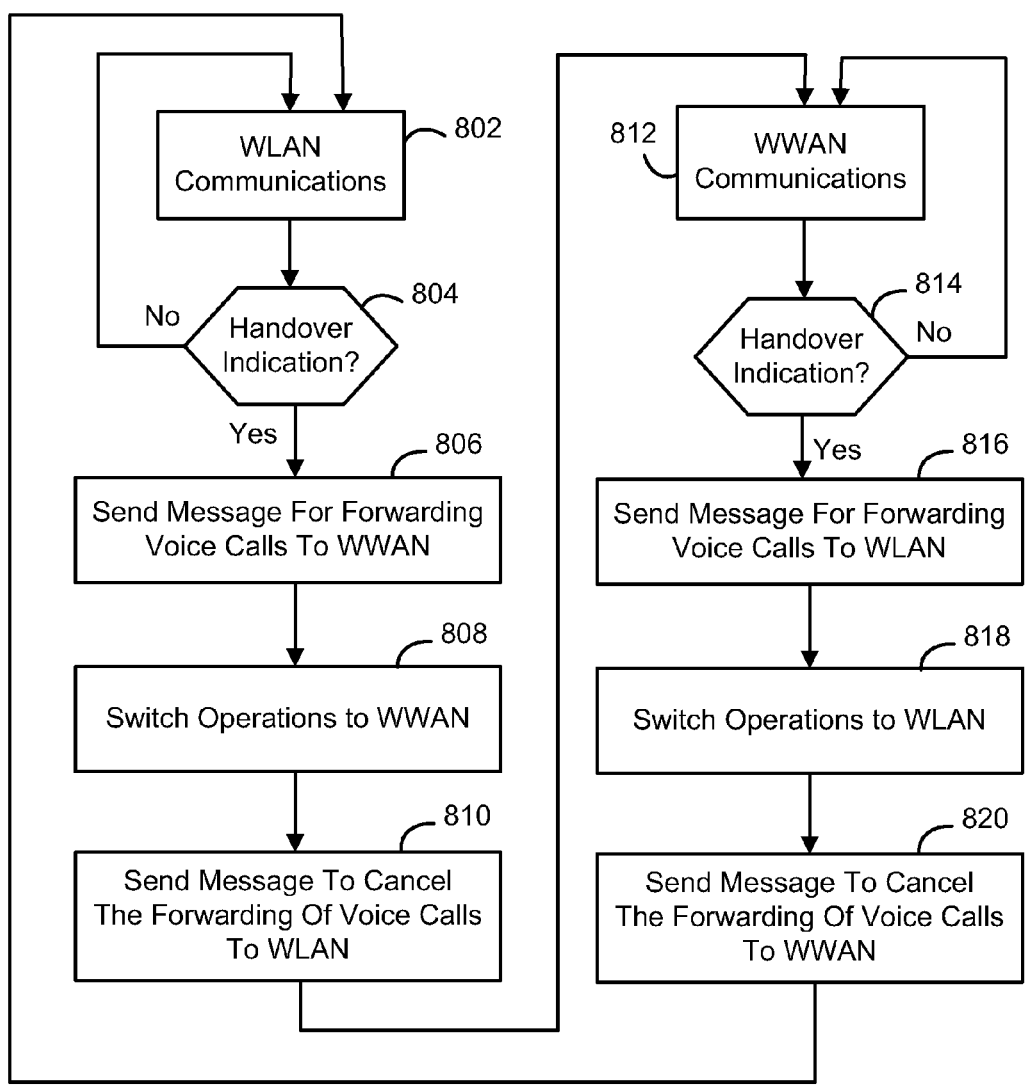
FIG. 8 is a flowchart which helps describe call forwarding methods of the mobile terminal according to the present application.

FIG. 8 is a flowchart which helps describe call forwarding methods of the mobile terminal according to the present application. The steps of the flowchart are taken from the perspective of the mobile terminal having a dual- or multi-mode capability. The steps of the flowchart are performed by one or more controllers or processors of the mobile terminal (e.g. see FIGS. 1 and 3), and may be embodied as a computer program product which includes a computer readable medium and computer instructions stored in the computer readable medium which are executable by the controllers/processors for performing the method.

It is initially assumed that steady-state communication operations are between the mobile terminal and a WLAN (step 802 of FIG. 8). If the mobile terminal identifies that a vertical handoff from the WLAN to the WWAN is imminent (step 804 of FIG. 8), then operation proceeds to step 806; otherwise the mobile terminal continues to operate in the WLAN at step 806. When the vertical handoff is identified to be imminent at step 804 (e.g. see transition in FIGS. 5-7), then the mobile terminal sends to the WLAN a message for forwarding all voice calls directed to the WLAN identification number to the WWAN (step 806 of FIG. 8). Preferably, this message includes the call forwarding number, that is, the WWAN identification number where the mobile terminal will be reachable in the WWAN. The WWAN identification number of the call forwarding message is received and stored at a location server (e.g. location server 130 of FIG. 2) so that any call destined to the mobile terminal in the WLAN will be redirected to the mobile terminal in the WWAN. Next, the mobile terminal causes communication operations to be switched from the WLAN to the WWAN (step 808 of FIG. 8). For example, see the position of mobile terminal 102 in FIG. 6. The WLAN transceiver portion of the mobile terminal is placed into a power down mode of operation, as it is no longer in use. After switching communication operations to the WWAN, the mobile terminal sends to the WWAN a message for cancelling the previous call forwarding of all voice calls directed to the WWAN identification number to the WLAN (step 810 of FIG. 8). This message need not include any call forwarding number, but merely a command to cancel the call forwarding. Thus, the mobile terminal is reachable in the WWAN by use of the WWAN identification number as well as the WLAN identification number since the WWAN forwarding number was previously received and stored at the location server (e.g. location server 130 of FIG. 2).

Steady-state communication operations then proceed between the mobile terminal and the WWAN (step 812 of FIG. 8). If the mobile terminal identifies that a vertical handoff from the WWAN to the WLAN is imminent (step 814 of FIG. 8), then operation proceeds to step 816; otherwise the mobile terminal continues to operate in the WWAN at step 812. When the vertical handoff is identified to be imminent at step 814 (e.g. see transition in FIGS. 6-7), then the mobile terminal sends to the WWAN a message for forwarding all voice calls directed to the WWAN identification number to the WLAN (step 816 of FIG. 8). Preferably, this message includes the call forwarding number, that is, the WLAN identification number where the mobile terminal will be reachable in the WLAN. The WLAN identification number of the call forwarding message is received and stored at a HLR of the WWAN (e.g. HLR 132 of FIG. 1) or other database so that any call destined to the mobile terminal in the WWAN will be redirected to the mobile terminal in the WLAN. Next, the mobile terminal causes communication operations to be switched from the WWAN to the WLAN (step 818 of FIG. 8). For example, see the position of mobile terminal 102 in FIG. 6. The WWAN transceiver portion of the mobile terminal is then placed into a power down mode of operation, as it is no longer in use. After switching communication operations to the WLAN, the mobile terminal sends to the WLAN a message for cancelling the previous call forwarding of all voice calls directed to the WLAN identification number to the WWAN (step 820 of FIG. 8). This message need not include any call forwarding number, but merely a command to cancel the call forwarding. Thus, the mobile terminal is reachable in the WLAN by use of the WLAN identification number as well as the WWAN identification number since the WLAN forwarding number was previously received and stored at the HLR (e.g. HLR 132 of FIG. 1). Steady-state communication operations then proceed between the mobile terminal and the WLAN in step 802, and operation repeats as described previously. The flowchart description for FIG. 8 is completed.

Referring back to FIG. 5, note that a wireless AP 614 may be provided in WLAN 190 to serve as an AP tripwire in an RF coverage region 502 (i.e. an ingress/egress region between dashed lines 550 and 552) of WLAN 190. This may provide an adequate triggering mechanism for mobile terminal 102 to send the call forwarding message and switch communication operations to the WWAN, when switching as described in relation to step 806-810 and/or steps 816-820 of FIG. 8. However, there is still a concern that, during the transition through travel path 410 shown in FIG. 5, mobile terminal 102 may fail to adequately send the forwarding message to forward calls directed to the WLAN identification number to the WWAN. This may happen, for example, due to an abrupt RF coverage "cut-off" inherent in WLANs; this problem is not inherent in WWANs as they are assumed to provide relatively continuous coverage for all practical purposes. Due to this problem, mobile terminal 102 is further configured to operate to send the forwarding message of step 806 of FIG. 8 through the WWAN after communication operations are switched to and established with the WWAN in step 808. In this case, mobile terminal 102 utilizes its data communication capability in the WWAN (e.g. see earlier description in relation to FIGS. 1 and 3) to send a forwarding or location message with the WWAN identification number through Internet 130 to location server 230.

This particular technique may be an alternative step to step 806 of FIG. 8, or an additional "backup" step to step 806 of FIG. 8. If it is an alternative step to step 806 of FIG. 8, then the mobile terminal may be operative to always use its WWAN transceiver portion to communicate call forwarding information and cancel call forwarding information to the appropriate network components (WWAN, and even WLAN in steps 806 and/or 820). If it is an additional backup step to step 806 of FIG. 8, then the step may be performed by mobile terminal 102 in response to detecting any suitable condition where it is required to ensure or confirm an adequate call forwarding state. For example, the mobile terminal may have detected an abrupt WLAN coverage loss where only WWAN coverage is available. As another example, the mobile terminal may have detected a power-down by the end user or reset, followed by a power-on where WWAN coverage is available and WLAN coverage is not.

Thus, methods and apparatus for use by a mobile communication device in facilitating voice calls through a wireless local area network (WLAN) and a wireless wide area network (WWAN) have been described. When switching communication operations from a WLAN coverage region of the WLAN to a WWAN coverage region of the WWAN, the mobile device causes a message for forwarding voice calls to a WWAN identification number of the mobile device to be transmitted through the WLAN. The mobile device subsequently causes a message for cancelling the forwarding of voice calls to a WLAN identification number of the mobile device to be transmitted through the WWAN. When switching communication operations from the WWAN coverage region of the WWAN to the WLAN coverage region of the WLAN, the mobile device causes a message for forwarding voice calls to the WLAN identification number of the mobile device to be transmitted through the WWAN. The mobile device subsequently causes a message for cancelling the forwarding of voice calls to the WWAN telephone number of the mobile device to be transmitted through the WLAN. Other additional and alternative techniques are described for reliable reachability.

The above-described embodiments of the present application are intended to be examples only. Although the embodiment described related to a WLAN of the 802.11 type and a WWAN of the cellular network type, any suitable wireless network technologies may be utilized, such as WiMAX technologies (e.g. 802.16e-based technologies). For example, the WLAN may be an 802.11-based network and the WWAN may be an 802.16e-based network. As another example, the WLAN may be an 802.16e-based network and the WWAN may be the cellular network. Those of skill in the art may effect alterations, modifications and variations to the embodiments without departing from the scope of the application.

What is claimed is:

1. A method for use by a mobile communication device in facilitating voice calls through a wireless local area network (WLAN) and a cellular telecommunications network, the mobile communication device having a Session Initiation Protocol (SIP) identity for identification in the WLAN and a telephone number for identification in the cellular telecommunications network, the WLAN including a SIP proxy server and a gateway which is connected to a telephone network, the method comprising:

operating in the WLAN for Voice over IP (VoIP) communications, including:
      registering with registrar server functionality of the SIP proxy server with the SIP identity, the SIP identity being further communicated to a location server;
      in response to an incoming voice call from a caller via the telephone network, receiving an INVITE request which is issued from the gateway and forwarded from the SIP proxy server, and sending a response to the SIP proxy server which is communicated to the caller via the gateway;

when switching communication operations from the WLAN to the cellular telecommunications network:
sending, via the WLAN to the location server, a message for forwarding voice calls directed to the SIP identity of the mobile communication device to the telephone number of the mobile communication device; and
sending, via the cellular telecommunications network, a message for canceling the forwarding of voice calls directed to telephone number of the mobile communication device to the SIP identity of the mobile communication device.

2. The method of claim 1, further comprising:
when switching communication operations from the cellular telecommunications network to the WLAN:
sending, via the cellular telephone network, a message for forwarding voice calls directed to the telephone number of the mobile communication device to the SIP identity of the mobile communication device; and
sending, via the WLAN to the location server, a message for canceling the forwarding of voice calls directed to the SIP identity of the mobile communication device to the telephone number of the mobile communication device.

3. The method of claim 1, wherein the WLAN comprises an IEEE 802.11-based wireless network.

4. The method of claim 1, further comprising:
after switching the communication operations to the cellular telephone network:
detecting a predetermined condition; and
sending the message for forwarding voice calls directed to the telephone number of the mobile communication device to the SIP identity in response to detecting the predetermined condition.

5. The method of claim 1, wherein an association is made between the SIP identity and a home location register (HLR) of the cellular telecommunications network for the forwarding of voice calls.

6. The method of claim 1, wherein an association is made between the cellular telephone number and a location server of the WLAN for the forwarding of voice calls.

7. A computer program product, comprising:
a non-transitory computer readable medium;
computer instructions stored in the non-transitory computer readable medium;
the computer instructions being executable by one or more processors of a mobile communication device which has a Session Initiation Protocol (SIP) identity for identification in a WLAN and a telephone number for identification in a cellular telecommunications network, the WLAN including a SIP proxy server and a gateway which is connected to a telephone network, the computer instructions being executable for:
operating in the WLAN for Voice over IP (VoIP) communications, including:
registering with registrar server functionality of the SIP proxy server with the SIP identity, the SIP identity being further communicated to a location server;
in response to an incoming voice call from a caller via the telephone network, receiving an INVITE request which is issued from the gateway and forwarded from the SIP proxy server, and sending a response to the SIP proxy server which is communicated to the caller via the gateway;
when switching communication operations from the WLAN to the cellular telecommunications network:
sending, via the WLAN to the location server, a message for forwarding voice calls directed to the SIP identity of the mobile communication device to the telephone number of the mobile communication device; and
sending, via the cellular telecommunications network, a message for canceling the forwarding of voice calls directed to telephone number of the mobile communication device to the SIP identity of the mobile communication device.

8. The computer program product of claim 7, wherein the computer instructions are further executable for:
when switching communication operations from the cellular telecommunications network to the WLAN:
sending, via the cellular telephone network, a message for forwarding voice calls directed to the telephone number of the mobile communication device to the SIP identity of the mobile communication device; and
sending, via the WLAN to the location server, a message for canceling the forwarding of voice calls directed to the SIP identity of the mobile communication device to the telephone number of the mobile communication device.

9. The computer program product of claim 7, wherein an association is made with the SIP identity at a home location register (HLR) of the cellular telecommunications network for the forwarding of voice calls.

10. The computer program product of claim 7, wherein an association is made with the cellular telephone number at the location server of the WLAN for the forwarding of voice calls.

11. A mobile communication device which is configured to utilize a Session Initiation Protocol (SIP) identity for identification in a wireless local area network (WLAN) and a telephone number for identification in a cellular telecommunications network, the mobile communication device comprising:
a first RF transceiver portion which is configured for communications with the cellular telecommunications network;
a second RF transceiver portion which is configured for communications with the WLAN;
one or more processors coupled to the first and the second RF transceiver portions;
the one or more processors being configured for:
operating in the WLAN for Voice over IP (VoIP) communications, including:
registering with registrar server functionality of a SIP proxy server with the SIP identity, the SIP identity being further communicated to a location server;
in response to an incoming voice call from a caller via a telephone network, receiving an INVITE request which is issued from a gateway and forwarded from the SIP proxy server, and sending a response to the SIP proxy server which is communicated to the caller via the gateway;
when switching communication operations from the WLAN to the cellular telecommunications network:
sending, via the WLAN to the location server, a message for forwarding voice calls directed to the SIP identity of the mobile communication device to the telephone number of the mobile communication device; and
sending, via the cellular telecommunications network, a message for canceling the forwarding of voice calls directed to telephone number of the mobile communication device to the SIP identity of the mobile communication device.

12. The mobile communication device of claim 11, wherein the one or more processors are further configured for:
  when switching communication operations from the cellular telecommunications network to the WLAN:
    sending, via the cellular telephone network, a message for forwarding voice calls directed to the telephone number of the mobile communication device to the SIP identity of the mobile communication device; and
    sending, via the WLAN to the location server, a message for canceling the forwarding of voice calls directed to the SIP identity of the mobile communication device to the telephone number of the mobile communication device.

13. The mobile communication device of claim 11, wherein the WLAN comprises an IEEE 802.11-based wireless network.

14. The mobile communication device of claim 11, wherein the one or more processors are further configured for:
  after switching the communication operations to the cellular telephone network:
    detecting a predetermined condition; and
    sending the message for forwarding voice calls directed to the telephone number of the mobile communication device to the SIP identity in response to detecting the predetermined condition.

15. The mobile communication device of claim 11, wherein an association is made with the SIP identity at a home location register (HLR) of the cellular telecommunications network for the forwarding of voice calls.

16. The mobile communication device of claim 11, wherein an association is made with the cellular telephone number at a location server of the WLAN for the forwarding of voice calls.

* * * * *